Nov. 20, 1962  E. FREY  3,065,299
MULTI-PURPOSE CODE RECORDER
Filed Aug. 20, 1959  3 Sheets-Sheet 1
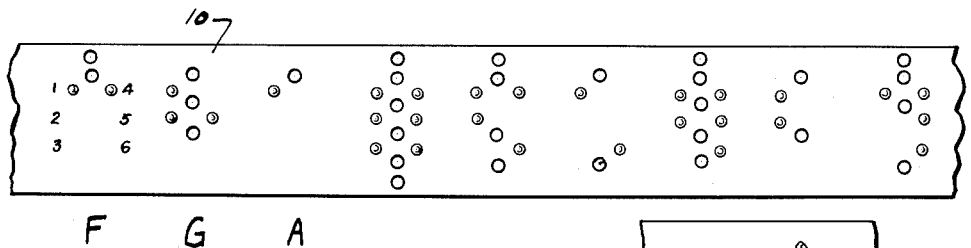
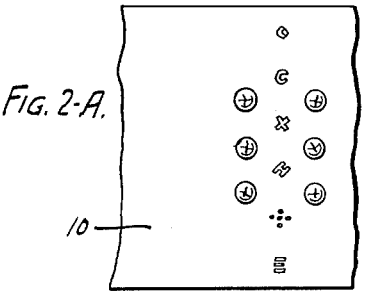
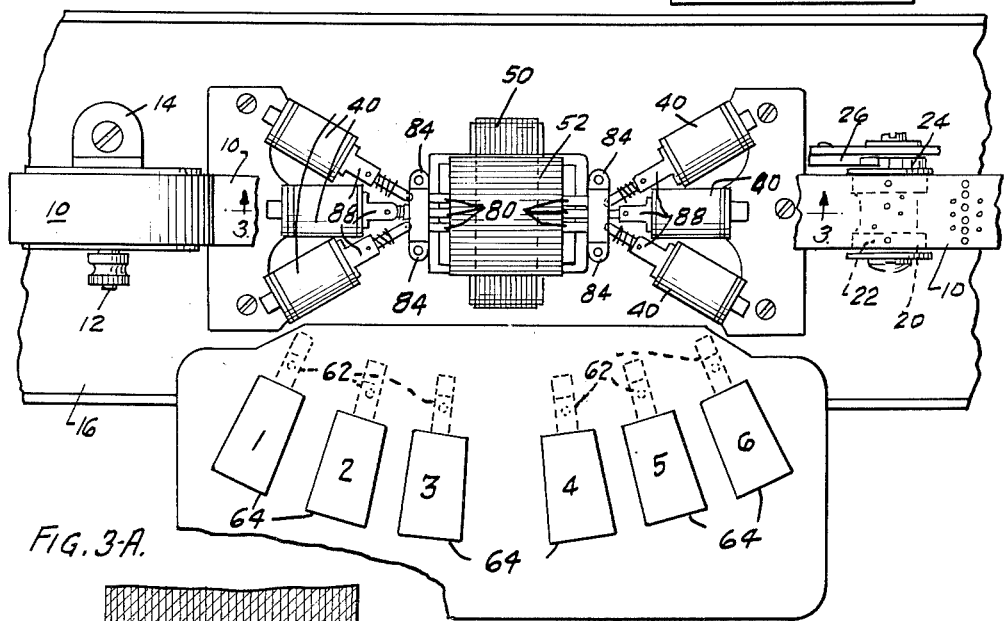
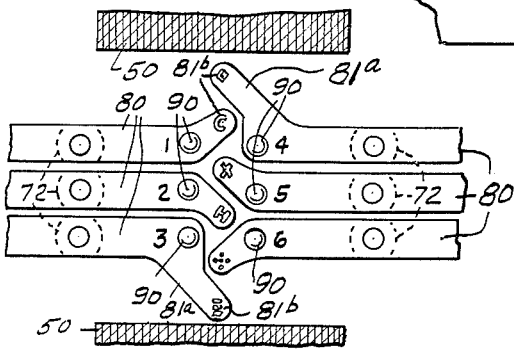
INVENTOR
ERIK FREY
BY Harry H. Hitzeman
ATTORNEY.

Nov. 20, 1962 E. FREY 3,065,299
MULTI-PURPOSE CODE RECORDER
Filed Aug. 20, 1959 3 Sheets-Sheet 2

INVENTOR
ERIK FREY
BY Harry H. Hitzeman
ATTORNEY

Nov. 20, 1962  E. FREY  3,065,299
MULTI-PURPOSE CODE RECORDER
Filed Aug. 20, 1959  3 Sheets-Sheet 3
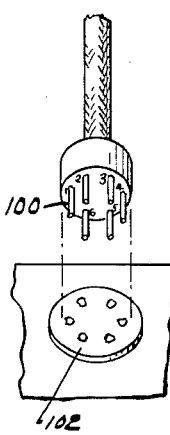
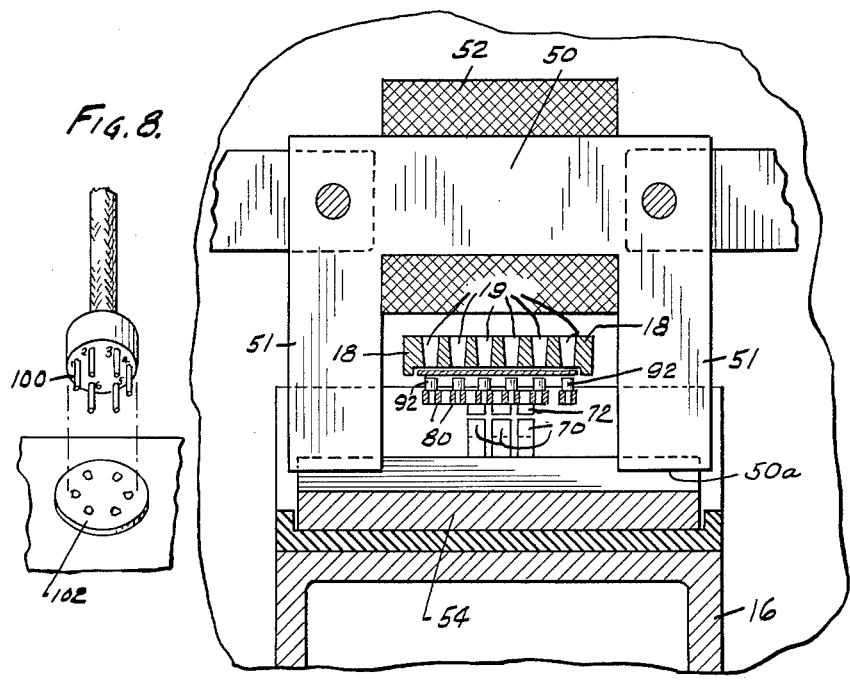
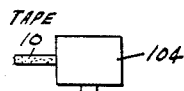
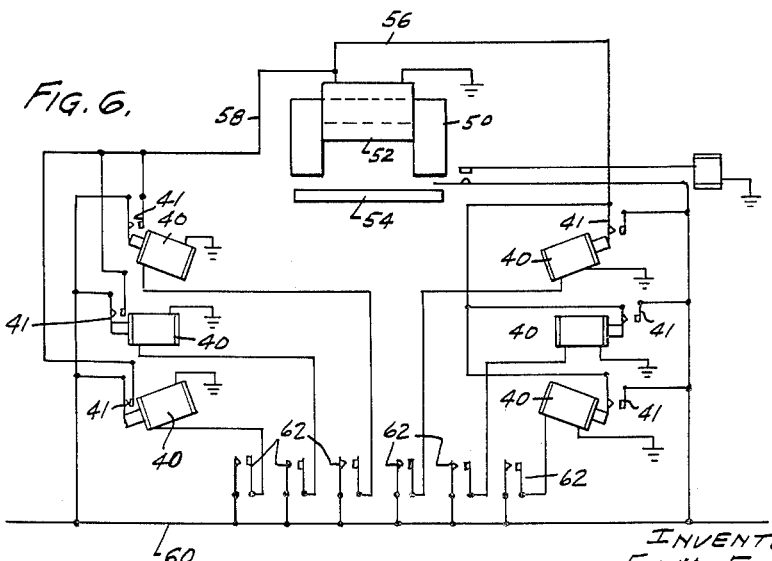
INVENTOR
ERIK FREY
BY Harry H. Hetzman ATTY.

3,065,299
MULTI-PURPOSE CODE RECORDER
Erik Frey, 3414 N. Clarendon Ave., Chicago, Ill.
Filed Aug. 20, 1959, Ser. No. 835,091
1 Claim. (Cl. 178—92)

My invention relates to multi-purpose code recorders.

My invention relates more particularly to a multi-purpose code recorder which optionally permits a choice of two or more codes, separately or simultaneously. Briefly, my invention comprises a device by which a Braille code may be embossed upon a tape, which device is further arranged to simultaneously punch an additional code, such as used in Teletype, upon the tape. The device thus permits convenient communication between blind persons, or blind persons and non-blind persons, and the tape so formed may be further utilized in Teletype or Teletypesetter operations.

The principal object of my invention is to provide a code-recording machine by the use of which a pair of messages may be recorded on a tape simultaneously.

A further object of my invention is to provide a code-recording machine of the type described capable of recording messages upon, into or through paper or similar tape.

A further object of the invention is to provide mechanism for recording a typed message on a tape and simultaneously perforating a Braille message therewith.

Another object of the invention is to provide mechanism for recording messages on a tape simultaneously by printing and embossing or perforating.

Another object of the invention is to provide mechanism for effecting a Braille cell or signal between each typed signal or for optionally effecting only a typed or a Braille signal.

Mechanism of the type which I am about to describe has a great many commercial possibilities. By incorporating on a tape or other medium typed and/or Braille messages, blind persons or others who understand Braille can send or receive messages, or blind persons can communicate with non-blind persons and vice versa. Thus new fields of employment and social and cultural enjoyment are made available to the blind, as well as wider fields of communication with the blind.

For a better understanding of the invention and the methods of accomplishing the same, reference is made to the accompanying drawings, upon which—

FIG. 1 is a fragmentary plan view showing one form of mechanism which I employ for writing messages upon a tape, and showing the tape broken to show mechanism beneath the same;

FIG. 2 is a plan view of a strip of tape, showing messages in two codes thereon;

Figures 3, 4:
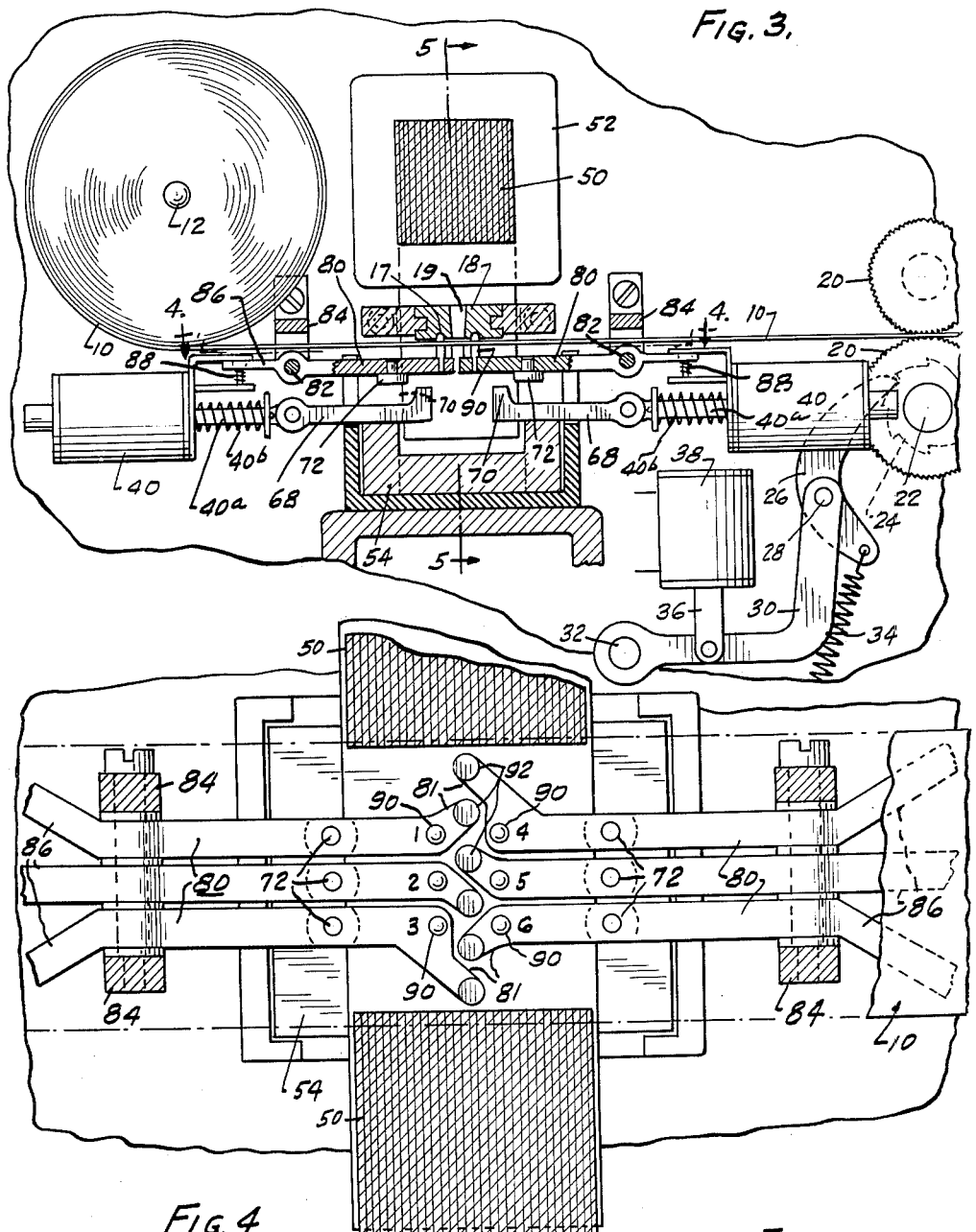

FIG. 2-A is a plan view of a fragment of tape having a typed and a Braille message thereon;

FIG. 3 is an enlarged fragmentary plan view of a portion of the mechanism of FIG. 1 below the stationary platen;

FIG. 3-A is a similar fragmentary plan view of the hammer levers using type characters and embossing means;

FIG. 4 is a cross-sectional view of the mechanism taken generally on the line 4—4 of FIG. 1;

FIG. 5 is a transverse sectional view through the upper coil, core and stationary platen, taken generally on the line 5—5 of FIG. 4;

FIG. 6 is a schematic wiring diagram of the circuit which I employ for operating the mechanism;

FIG. 7 is a generally diagrammatic view showing the use of a scrambling device in connection with my improved code recorder; and FIG. 8 shows one type of plug or switch which may be employed in connection with the scrambling device.

In the embodiment of the invention which I have chosen to illustrate the same, I provide a roll of tape 10, suitably mounted in a horizontal position upon a support pin 12 carried by a bracket 14 mounted upon a suitable base 16.

The tape 10 is adapted to be fed in a horizontal plane beneath a stationary platen 18, being pulled through the recording mechanism by serrated wheels 20 that are moved in step-by-step relation. The lower wheel 20 may be mounted upon a shaft 22 that also has a toothed ratchet wheel 24 thereon, the ratchet wheel being moved forward step-by-step by means of a ratchet dog 26 mounted upon a pivot pin 28 at the upper end of an angle-shaped operating arm 30 pivoted at its opposite end on a pivot pin 32. A spring member 34 connected to one end of the ratchet arm 26 normally holds the end of the same in engagement with the toothed ratchet wheel 24.

The ratchet wheel may be actuated in step-by-step relationship by the core 36 of an electromagnet 38 which may be energized with each character that is recorded on the tape, so that with each impression, perforation or printing on the tape, it will be moved forward one step. As best shown in the wiring diagram, FIG. 6, the solenoid 38 is energized with the energization of any one of the type key energizing electromagnets 40 which will be hereinafter described.

Each of the electromagnets 40, of which there are 6, are arranged generally upon opposite sides of a centrally located U-shaped magnet or core member 50 that has a winding 52 thereon between the depending legs 51, the negative and positive poles of the magnet. The general purpose of this arrangement is to attract the platform 54 and raise the same whenever the coil 52 is energized by current through the line 56 or the line 58, either of said lines being closed to form a connection with the service line 60 when any one of the switches 41 of the electromagnet 40 is actuated.

The solenoids 40 are under control of manual switches 62, the switches including the finger key 64 and lever 66 connected to the same. Thus when any of the switches 62 is closed by depression of one of the keys 64, one of the coils of the solenoids 40 will be energized and movement of the core 40a will move the hammer lever 68 with its hammer head 70 to a point directly below one of the hardened pins 72 that are mounted on the under surface of pivoted arms 80 which carry the character producing elements.

In the embodiment of the invention shown herein, there are six of these arms 80 shown, three to the right and three to the left of the stationary platen 18, the arms 80 being pivotally mounted on pins 82 carried by stationary support brackets 84 on each side of the arms 80. The arms each have a back extension 86 which engages beneath the upper leg of a U-shaped bracket 88 fastened to the front of one of the electromagnets 40, the end of the same being normally held up by a coiled spring 89 below the end 86 and resting on the lower leg of the bracket 88. Thus, whenever the forward end of the arm 80 is swung upwardly to effect a character impression in a manner which will be hereinafter described, the spring will swing the extended end of the arm 80 down to its normal position, as shown in FIG. 4.

In the plan view of the arms 80 shown in FIG. 3, it can be seen that the forward ends 81 of the same each carry a round-headed embossing pin 90 and a punch 92, the ends of the arms 80 being so formed that there is a central row of six punches 92 in vertical alignment, and two vertical rows of three embossing pins 90 on each side of the row of punches.

In the fragmentary plan view of the arms 80 shown in

FIG. 3–A, the forward ends 81a of the same carry the round-headed embossing pin 90 and type indicia 81b so that a type and a Braille signal may be effected with each depression of the keys.

Referring now briefly to the tape 10 shown in FIG. 2, a message in Braille has been embossed upon the tape and also a further code message caused by the rows of perforations. As is well known, in the Braille system of writing, the letters in the alphabet are formed from two vertical rows of embossed dots, called cells, the dots being numbered 1, 2, 3, reading down in the first vertical row, and 4, 5, 6, reading down in the second vertical row. In this code, the letter A, for example, is embossment of dot 1 in the first row; the letter D is dot 1 in the first row and 4 and 5 in the second row; F is dot 1 in the first row and dot 4 in the second row, etc.

Thus, a person equipped with a code recorder having six keys, as shown, with the six round-headed pins 90, can type a code message in Braille on a strip of tape. Additionally, a Teletype or a Teletypesetter code which uses one or more of six vertical punched holes may be placed between the two rows of Braille, as shown in FIG. 2–A, the holes usually being made by key operation of punches such as the punch 92. Therefore if a person makes the Braille impressions as shown on the tape, as well as the punched holes in one operation, the message being produced will be in two different codes—Braille and a Teletype or other code. By using the arms shown in FIG. 3–A, a Braille message and a typed message of typed indicia may simultaneously be effected. This type of writing is done by the mechanism which I provide.

Continuing now with the description of the arms 80 provided with the punches 92 and the round-headed pins 90, the hammer levers 68 are drawn beneath the hardened pins 72 when the particular keys are depressed, and the circuit is simultaneously closed through the coil 52 so that the movable or iron platform 54 is raised against the ends 50a of the U-shaped core members 51. This action moves the hammer ends 70 of the levers 68 upwardly against the hardened pins 72 and moves the particular type arm 80 upwardly, causing an embossment or impression with the pin head 90 and cutting a hole with the punch 92 through the tape 10.

The stationary platen shown is provided with six vertical openings 19 for the punches 92 and six cavities 17 for the pin members 90. In other words, whenever it is desired to record a letter, the particular keys 64, which are aligned with the particular positions in the rows of pins 90 and punches 92, are depressed. For example, to produce the recording of the letter F upon the tape, the operator would push down the particular keys having the number from 1 to 6 thereon (for F, key #1 and key #4), which would in turn punch the two top holes in the vertical row of holes between the perforated openings.

When the coils 40 are not energized, such as when the switches 62 are open, the spring 40b around each metal core 40a therein moves the hammer levers 68 outwardly from the coils so that when the iron platform 54 is raised during a printing operation, the hammer head 70 will move up beyond the hardened pin 72 and not cause the particular key to be raised to make an impression. Thus in each operation only those keys are raised in which the hammer heads 70 underlie the hardened pins 72.

From the above and foregoing description it can be seen that I have provided a comparatively simple yet absolutely accurate code recorder which may be used by any person to transmit a message in both a telegraphic code and a Braille code. This permits a Braille operator, blind or otherwise, to transmit messages both in Braille and in an additional code, and also permits the recipient, either blint or otherwise, to be able to translate the coded message upon reading the tape.

In FIGS. 7 and 8 I have shown the mechanism which I employ as provided with a scrambling device S. This device may, for example, include a 6-pronged plug 100 and a socket 102 for the same. Thus where the recorder is connected by a circuit to a receiving recorder 104, the scrambling may take place at the sending end, and the message can be decoded or unscrambled by the receiver using a similar plug and socket, but with the prongs rotated so that the circuit is corrected for the message to go through the receiving recorder.

The mechanism which I have provided is also fully capable of use as a commercially competitive perforator for use in data processing, communications and other automation. Signalling from typewriter-like keyboards such as Teletype, Teletypesetter and typewriter keyboards could operate the mechanism shown, and with a double set of separate signals could effectively signal either one or both of the codes at the operator's discretion. The mechanism thus lends itself for use in many ways and is not necessarily limited to usefulness for communication with the blind.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

An electromagnetic code recorder having two code arrangements, a vertical perforated code and a Braille code, the Braille code cell having a vertical row of embossments on each side of said vertical perforations, said recorder including two sets of character supporting arms disposed facing each other, each arm having a punch and a round-headed perforator thereon, a hammer lever positioned under each arm, means to selectively move one or more of the hammer levers into engagement with an associated arm, and means to move the hammer levers upwardly relative to said arms.

References Cited in the file of this patent
UNITED STATES PATENTS

| | | |
|---|---|---|
| 2,134,005 | Potts | Oct. 25, 1938 |
| 2,174,731 | Dirkes et al. | Oct. 3, 1939 |